US009553977B2

(12) United States Patent
Kulkarni

(10) Patent No.: US 9,553,977 B2
(45) Date of Patent: *Jan. 24, 2017

(54) SYSTEM AND METHOD FOR AUTOMATED ADAPTATION AND IMPROVEMENT OF SPEAKER AUTHENTICATION IN A VOICE BIOMETRIC SYSTEM ENVIRONMENT

(71) Applicant: Cyara Solutions Pty Ltd, Melbourne, Victoria (AU)

(72) Inventor: Alok Kulkarni, Glen Iris (AU)

(73) Assignee: Cyara Solutions Pty Ltd, Hawthorn (AU)

( * ) Notice: Subject to any disclaimer, the term of this patent is extended or adjusted under 35 U.S.C. 154(b) by 0 days.

This patent is subject to a terminal disclaimer.

(21) Appl. No.: 14/834,390

(22) Filed: Aug. 24, 2015

(65) Prior Publication Data

US 2016/0057282 A1 Feb. 25, 2016

Related U.S. Application Data

(63) Continuation of application No. 14/139,862, filed on Dec. 23, 2013, now abandoned, which is a
(Continued)

(51) Int. Cl.
*G10L 17/04* (2013.01)
*H04M 3/22* (2006.01)
(Continued)

(52) U.S. Cl.
CPC ............ *H04M 3/2218* (2013.01); *G10L 17/00* (2013.01); *G10L 17/04* (2013.01); *H04M 3/323* (2013.01);
(Continued)

(58) Field of Classification Search
CPC ............ G06F 2201/815; G06F 2201/86; G06F 2201/865; G06F 2201/875; H04M 3/523; H04M 3/5191; H04M 3/323; H04M 3/5183; H04M 3/5158; H04M 3/5232; H04M 3/5233; H04M 3/2218; H04M 3/5175; H04M 1/2473; H04M 2201/40; H04M 3/42221; G10L 17/04
See application file for complete search history.

(56) References Cited

U.S. PATENT DOCUMENTS 6,002,760 A * 12/1999 Gisby ................ H04M 3/48
379/210.01
6,650,747 B1 * 11/2003 Bala ................. H04M 3/382
379/265.06
(Continued)

*Primary Examiner* — Abdelali Serrou
(74) *Attorney, Agent, or Firm* — Galvin Patent Law LLC; Brian R. Galvin

(57) ABSTRACT

A system for automated adaptation and improvement of speaker authentication in a voice biometric system environment, comprising a speech sample collector, a target selector, a voice analyzer, a voice data modifier, and a call flow creator. The speech sample collector retrieves speech samples from a database of enrolled participants in a speaker authentication system. The target selector selects target users that will be used to test the speaker authentication system. The voice analyzer extracts a speech component data set from each of the speech samples. The call flow creator creates a plurality of call flows for testing the speaker authentication system, each call flow being either an impostor call flow or a legitimate call flow. The call flows created by the call flow creator are used to test the speaker authentication system.

6 Claims, 12 Drawing Sheets

Related U.S. Application Data continuation-in-part of application No. 12/644,343, filed on Dec. 22, 2009, now Pat. No. 8,625,772, and a continuation-in-part of application No. 13/567,089, filed on Aug. 6, 2012, now abandoned.

(51) Int. Cl.
  *G10L 17/00* (2013.01)
  *H04M 3/32* (2006.01)
  *H04M 3/51* (2006.01)

(52) U.S. Cl.
  CPC ......... *H04M 3/5175* (2013.01); *H04M 3/5183* (2013.01); *H04M 2201/41* (2013.01); *H04M 2203/6054* (2013.01)

(56) References Cited

U.S. PATENT DOCUMENTS

| | | | | |
|---|---|---|---|---|
| 6,831,966 B1* | 12/2004 | Tegan | ................... | H04M 3/493 370/352 |
| 7,010,610 B1* | 3/2006 | Ringhof | ................ | H04M 3/523 709/232 |
| 7,245,711 B2* | 7/2007 | Margolis | ........... | H04L 29/06027 379/209.01 |
| 7,551,602 B2* | 6/2009 | Whitman | ................ | H04L 12/56 370/352 |
| 7,584,083 B1* | 9/2009 | Bajpay | ................... | G06Q 10/06 700/100 |
| 7,590,542 B2* | 9/2009 | Williams | ................ | H04M 3/24 704/235 |
| 7,689,426 B2* | 3/2010 | Matula | ................ | H04M 3/4938 379/265.03 |
| 7,822,803 B2* | 10/2010 | Seeley | ................ | G06F 11/3419 370/352 |
| 8,654,937 B2* | 2/2014 | Agapi | ..................... | H04M 1/64 379/88.09 |
| 8,666,056 B2* | 3/2014 | Makagon | ........... | G06Q 10/0631 379/265.01 |
| 8,687,792 B2* | 4/2014 | Yacoub | ............. | H04M 2201/40 379/265 |
| 9,106,749 B2* | 8/2015 | Schultz | ............... | H04M 3/5233 |
| 2005/0165930 A1* | 7/2005 | Whitman, Jr. | ... | G06Q 10/06311 709/226 |
| 2006/0233346 A1* | 10/2006 | McIlwaine | ............... | G06Q 10/06 379/265.02 |
| 2007/0121824 A1* | 5/2007 | Agapi | ................ | H04M 3/5175 379/88.18 |

* cited by examiner

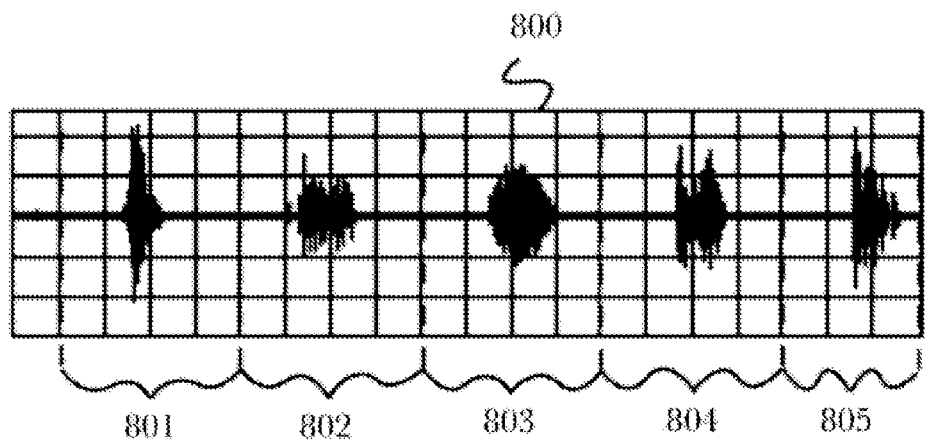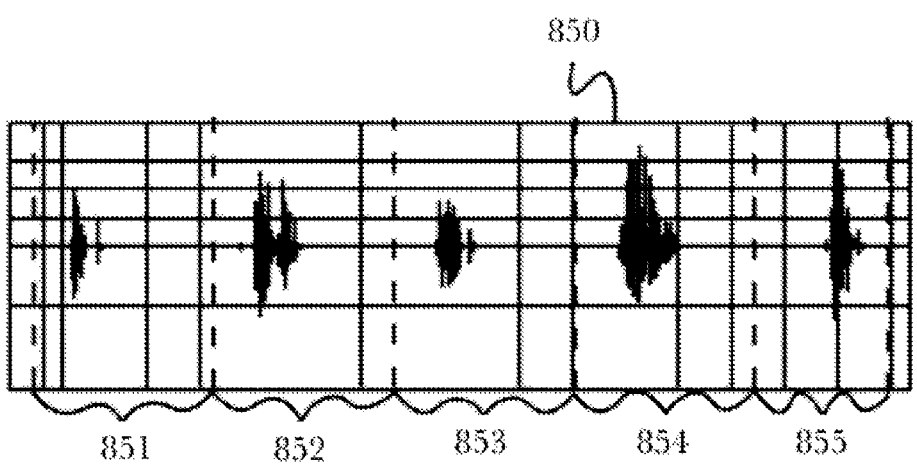
Fig.8

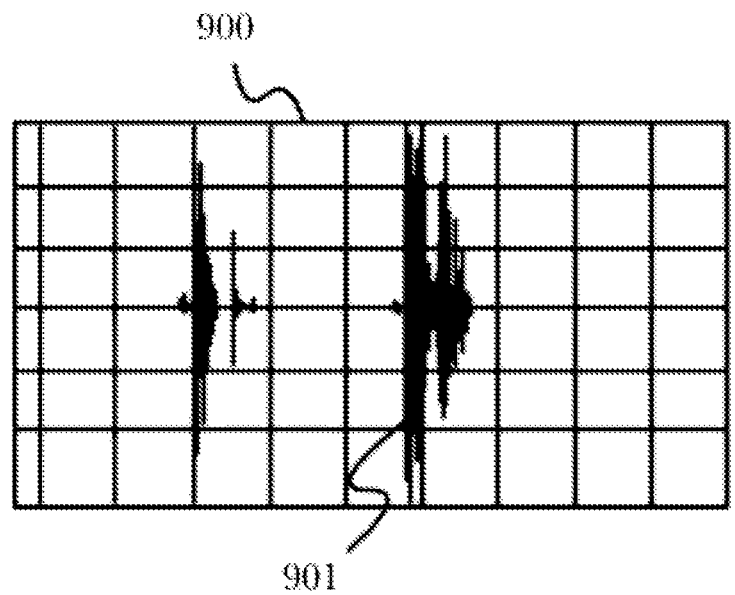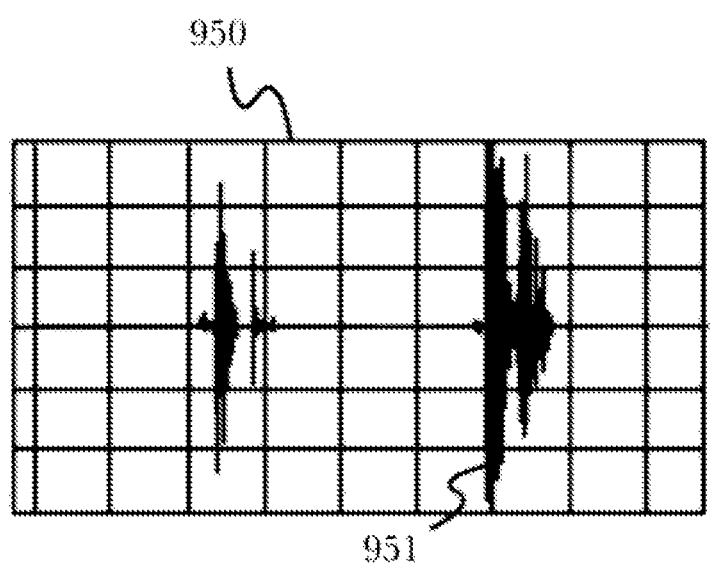
Fig.9

SYSTEM AND METHOD FOR AUTOMATED ADAPTATION AND IMPROVEMENT OF SPEAKER AUTHENTICATION IN A VOICE BIOMETRIC SYSTEM ENVIRONMENT

CROSS-REFERENCE TO RELATED APPLICATIONS

The present invention is a continuation of U.S. patent application Ser. No. 14/139,862, filed on Dec. 23, 2013 and titled "SYSTEM AND METHOD FOR AUTOMATED ADAPTATION AND IMPROVEMENT OF SPEAKER AUTHENTICATION IN A VOICE BIOMETRIC SYSTEM ENVIRONMENT", which is a continuation-in-part of U.S. patent application Ser. No. 12/644,343, now issued at U.S. Pat. No. 8,625,772 on Jan. 7, 2014, and titled "INTEGRATED TESTING PLATFORM FOR CONTACT CENTRES", which is also a continuation-in-part of U.S. patent application Ser. No. 13/567,089, filed on Aug. 6, 2012, and titled "SYSTEM AND METHOD FOR AUTOMATED ADAPTATION AND IMPROVEMENT OF SPEAKER AUTHENTICATION IN A VOICE BIOMETRIC SYSTEM ENVIRONMENT", the entire specification of each of which is incorporated herein by reference in their entirety.

BACKGROUND OF THE INVENTION

Field of the Invention

The invention relates to the field of voice biometric systems encompassing speakers in communication networks, and particularly to the field of automated adaptation and improvement of speaker authentication accuracy in a communication network.

Discussion of the State of the Art

The field of voice biometrics has grown considerably with advances in speech recognition technology and computer processing capability. A speaker authentication system is a method for authenticating a speaker's identity using the acoustical elements of his voice. For example, an individual may wish to access his customer account using a telephone, while an enterprise handling the account may wish to ensure that only authorized individuals are able to access specific accounts. In these situations, the individual could authenticate her identity using her voice rather than (for example) inputting dual-tone multi-frequency (DTMF) digits on a telephone keypad to provide a personal identification number or PIN.

FIG. 4 illustrates a typical prior art architecture designed to support speaker authentication in a communication network. Speaker authentication system 401 performs two main functions, namely enrollment and authentication.

In the enrollment function, a speaker 410 speaks into the system through a voice interface 413 such as a telephone, microphone or other audio input mechanism. Speaker 410, whose identity is already known using other means, such as account and password through, for example, DTMF digit entry, is asked to repeat a collection of pre-configured phrases through an audio input mechanism (for example, a telephone) to be recognized by speech recognition engine 420. By analyzing various components of the speaker's voice data, enrollment processor 422 learns the speaker's voice pattern and creates a voice reference model that is then stored in speaker database 426. The same procedure would apply for each additional speaker, for example speaker 411 and speaker 412, who desire to enroll into speaker authentication system 401.

In subsequent voice interactions with the system, a speaker 411, who has previously enrolled with the system as described in the previous paragraph, can now authenticate her identity by using just her voice. Authentication interface 430 prompts the speaker to speak her account number and/or other identifying information. For example, the account number is recognized by speech recognition engine 420 and the corresponding account is accessed. Authentication processor 431 retrieves the associated voice reference model for speaker 411 from the speaker database 426. The speech pattern is then compared to the voice reference model by the comparison function 432. The comparison is checked to see whether the resulting score satisfies some threshold condition as defined by scoring threshold definition 433 to qualify as authenticated; for example, speaker authentication may only be completed when a confidence threshold of 95% is achieved. A decision on whether or not to authenticate the speaker is then made by the decision function 434.

Since an individual's voice from both the enrollment and authentication steps can often contain noise elements (including but not limited to ambient noise, additive noise resulting from the characteristics of the communication network, voice changes due to age, stress, or health, etc.) that could impede the accuracy of the speaker's true voice pattern, speaker authentication system 401 is apt to have a reduced accuracy that could result in security and usability issues by allowing false accepts (i.e. authenticating impostors), allowing false rejects (i.e. genuine speakers are rejected), or other unintended system issues. In order to mitigate these issues, a speaker authentication system must undergo regular testing and tuning to improve the authentication process by uncovering and removing security and usability issues.

In a typical voice biometric testing environment, a set of test speakers 451 use a test set of spoken account numbers, or other identifying information, of known enrolled speakers 400 to test the accuracy of the authentication system 431. In an example of one testing scenario, a test speaker 452 will speak the account number for a previously enrolled speaker 410. The authentication processor 431 uses the speech that is digitally recognized through an automatic speech recognition server 420 and retrieves the voice reference model that is associated to speaker 411 from the speaker database 426 and compared by the comparison function 432. The comparison is scored and cross-referenced to the scoring threshold definition 433. A decision on whether or not to authenticate the speaker is then made by the decision function 434. Since the testing effort knows that the speaker 452 is indeed an impostor, if the system authenticates the speaker 452 as speaker 410, then it is known that there is a security problem with the system.

The current art of testing voice biometric systems by manually creating test speaker samples and running them through the voice authentication system one-by-one would provide little improvement to the voice authentication system since creating enough test samples to thoroughly exercise the system would not be practical. Furthermore, the human labor required to create voice test samples in the current art would be incredibly expensive.

The problem with the current art is further compounded when speakers uses various communication devices and networks with a varying degrees of quality.

What is needed is the automatic creation of voice samples for testing as well as an automated way of presenting the test scenarios to the system in order to identify security and usability issues.

SUMMARY OF THE INVENTION

Accordingly, the inventor has conceived and reduced to practice, in a preferred embodiment of the invention, a system and various methods for automated adaptation and improvement of speaker authentication in a voice biometric system environment.

According to a preferred embodiment of the invention, a system for automated adaptation and improvement of speaker authentication in a voice biometric system environment, comprising a speech sample collector software module stored and operating on a network-attached server computer; a target selector software module stored and operating on a network-attached server computer; a voice analyzer software module stored and operating on a network-attached server computer; a voice data rearrangement software module stored and operating on a network-attached server computer; a voice data modification software module stored and operating on a network-attached server computer; and a call flow creator software module stored and operating on a network-attached server computer, is disclosed. According to the embodiment, the speech sample collector software module retrieves a plurality of speech samples from a database of speech samples of enrolled participants in a speaker authentication system; the target selector software module selects a plurality of target users of the speaker authentication system that will be used to test the speaker authentication system; the voice analyzer software module extracts a speech component data set from each of the plurality of speech samples; the call flow creator software module creates a plurality of call flows for testing the speaker authentication system; each call flow being either an impostor call flow or a legitimate call flow to be used for testing the speaker recognition system; the voice data rearrangement software module is used to rearrange a plurality of speech samples taken from impostor users in order to provide an impostor response to a prompt provided by the speaker authentication system being tested; and the plurality of call flows created by the call flow creator software module is used to test the speaker authentication system.

According to another embodiment of the invention, the system further comprises a voice reference model categorization software module stored and operating on a network-attached server computer. The voice reference model categorization software module categorizes some or all of the plurality of collected speech samples according to an attribute of users of the speaker authentication system that correspond to each categorized speech sample, and a plurality of impostor targets to be used for testing the speaker authentication are drawn from collected speech samples corresponding to users belonging to a same category as a legitimate target user.

According to a further embodiment of the invention, the system further comprises a voice data modification software module stored and operating on a network-attached server computer. The voice data modification software module is used to modify a plurality of impostor and legitimate speech samples to be used for testing.

According to yet another embodiment of the invention, the plurality of impostor and legitimate speech samples to be used for testing are modified by one or more of: insertion of ambient or other noise signals; insertion of specific characteristics of various voice network types such as voice over IP networks or mobile telephony networks; modification to simulate a specific speaker age; and modification to simulate effects of speaker stress or illness. In another embodiment, the system further comprises a campaign processor software module stored and operating on a network-attached server computer; a voice file presenter software module stored and operating on a network-attached server computer; and a result analyzer software module stored and operating on a network-attached server computer. According to the embodiment, the campaign processor software module determines a plurality of specific call flows to be presented to a speaker authentication system being tested; the voice file presenter software module presents each of the plurality of specific call flows to the speaker authentication system being tested and receives a test result from the speaker authentication system corresponding either to a passed or a failed authentication of the presented call flow; and the result analyzer software module analyzes a plurality of test results to generate at least an indicia of the reliability of the speaker authentication system.

According to another preferred embodiment of the invention, method for automated adaptation and improvement of speaker authentication in a voice biometric system environment, comprising the steps of: (a) retrieving, using a speech sample collector software module stored and operating on a network-attached server computer, a plurality of speech samples from a database of speech samples of enrolled participants in a speaker authentication system; (b) selecting, using a target selector software module stored and operating on a network-attached server computer, a plurality of target users of the speaker authentication system that will be used to test the speaker authentication system; (c) extracting, using a voice analyzer software module stored and operating on a network-attached server computer, a speech component data set from each of the plurality of speech samples; (d) creating, using a call flow creator software module stored and operating on a network-attached server computer, a plurality of call flows for testing the speaker authentication system, each call flow being either an impostor call flow or a legitimate call flow to be used for testing the speaker recognition system; (e) rearranging, using a voice data rearrangement software module stored and operating on a network-attached server computer, a plurality of speech samples taken from impostor users in order to provide an impostor response to a prompt provided by the speaker authentication system being tested; and (f) using the plurality of call flows created by the call flow creator software module to test the speaker authentication system, is disclosed.

According to another embodiment of the invention, the method further comprises the step of: (a1) categorizing, using a voice reference model categorization software module stored and operating on a network-attached server computer, some or all of the plurality of collected speech samples according to an attribute of users of the speaker authentication system that correspond to each categorized speech sample. A plurality of impostor targets to be used for testing the speaker authentication is drawn from collected speech samples corresponding to users belonging to a same category as a legitimate target user.

In yet another embodiment of the invention, the method further comprises the step of: (a2) using a voice data modification software module stored and operating on a network-attached server computer to modify a plurality of impostor and legitimate speech samples to be used for testing.

In another embodiment of the invention, the method is characterized in that the plurality of impostor and legitimate speech samples to be used for testing are modified by one or more of: insertion of ambient or other noise signals; insertion of specific characteristics of various voice network types such as voice over IP networks or mobile telephony networks; modification to simulate a specific speaker age; and modification to simulate effects of speaker stress or illness.

In a further embodiment of the invention, the method further comprises the steps of: (e1) campaign processor software module determines a plurality of specific call flows to be presented to a speaker authentication system being tested; (e2) presenting, using a voice file presenter software module stored and operating on a network-attached server computer, each of the plurality of specific call flows to the speaker authentication system being tested and receives a test result from the speaker authentication system corresponding either to a passed or a failed authentication of the presented call flow; and (e3) analyzing, using a result analyzer software module stored and operating on a network-attached server computer, a plurality of test results to generate at least an indicia of the reliability of the speaker authentication system.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

FIG. 8 is an illustration of a speech waveform that shows the elements that are reusable for call flow creation.

FIG. 9 is an illustration of a speech waveform that shows noise elements for enhanced ongoing testing.

DETAILED DESCRIPTION

Figure 1:
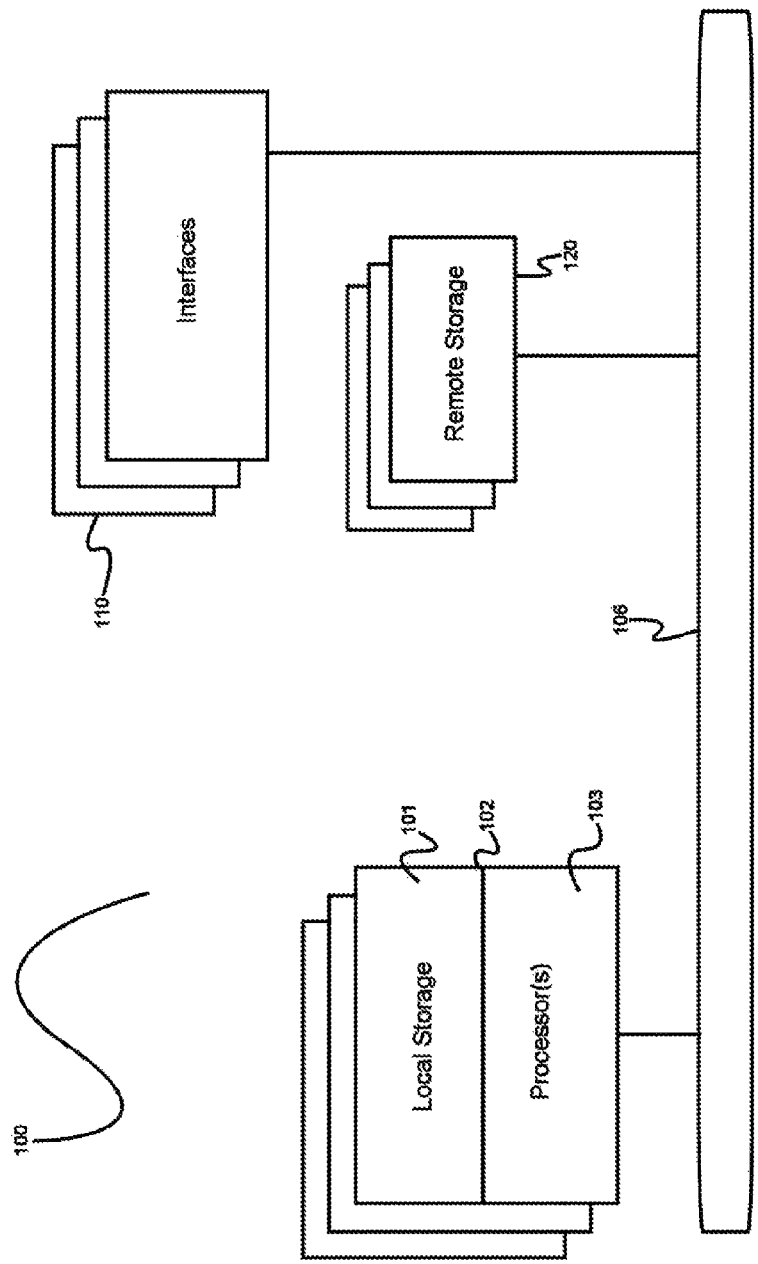
FIG. 1 is a block diagram illustrating an exemplary hardware architecture of a computing device used in an embodiment of the invention.

The inventor has conceived, and reduced to practice, a method and apparatus for the automatic improvement of voice biometric systems that addresses several shortcomings, described in the background section, of current systems in the art. Systems deployed in accordance with one or more embodiments of the invention will generally be easily extensible to handle new data sources, new call flow models, new interaction types, and series of multiple related interactions, all while providing a very strong answer to enterprise's security concerns.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

DEFINITIONS

A "database" or "data storage subsystem" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, column-oriented databases, in-memory databases, and the like. While various embodiments may preferentially employ one or another of the various data storage subsystems available in the art (or available in the future), the invention should not be construed to be so limited, as any data storage architecture may be used according to the embodiments. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as an expanded private capital markets database) may be implemented on a single machine, on a set of machines using clustering technology, on several machines connected by one or more messaging systems known in the art, or in a master/slave arrangement common in the art. These examples should make clear that no particular architectural approaches to database management is preferred according to the invention, and choice of data storage technology is at the discretion of each implementer, without departing from the scope of the invention as claimed.

Similarly, preferred embodiments of the invention are described in terms of a web-based implementation, including components such as web servers and web application servers. However, such components are merely exemplary of a means for providing services over a large-scale public data network such as the Internet, and other implementation choices may be made without departing from the scope of the invention. For instance, while embodiments described herein deliver their services using web services accessed via one or more webs servers that in turn interact with one or more applications hosted on application servers, other approaches such as peer-to-peer networking, direct client-server integration using the Internet as a communication means between clients and servers, or use of mobile applications interacting over a mobile data network with a one or more dedicated servers are all possible within the scope of the invention. Accordingly, all references to web services, web servers, application servers, and an Internet should be taken as exemplary rather than limiting, as the inventive concept is not tied to these particular implementation choices.

"Speaker recognition" is the computational task of validating a speaker's identity using acoustical characteristics extracted from their voice.

A "speech component" is a discrete component of recognized spoken string of voice data. For example, if the voice data was a string of numbers, "one two three", the "one" would be a speech component.

A "voice reference model" is a pattern of various components of the speaker's unique voice data that identifies them for use in a speaker verification system.

A "false accept" in a speaker verification system, is a situation where a speaker is authenticated as someone other than themselves (i.e. an impostor).

A "false reject" in a speaker verification system, is a situation where a speaker is not authenticated as who they are (i.e. a legitimate speaker who is not authenticated).

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface (s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
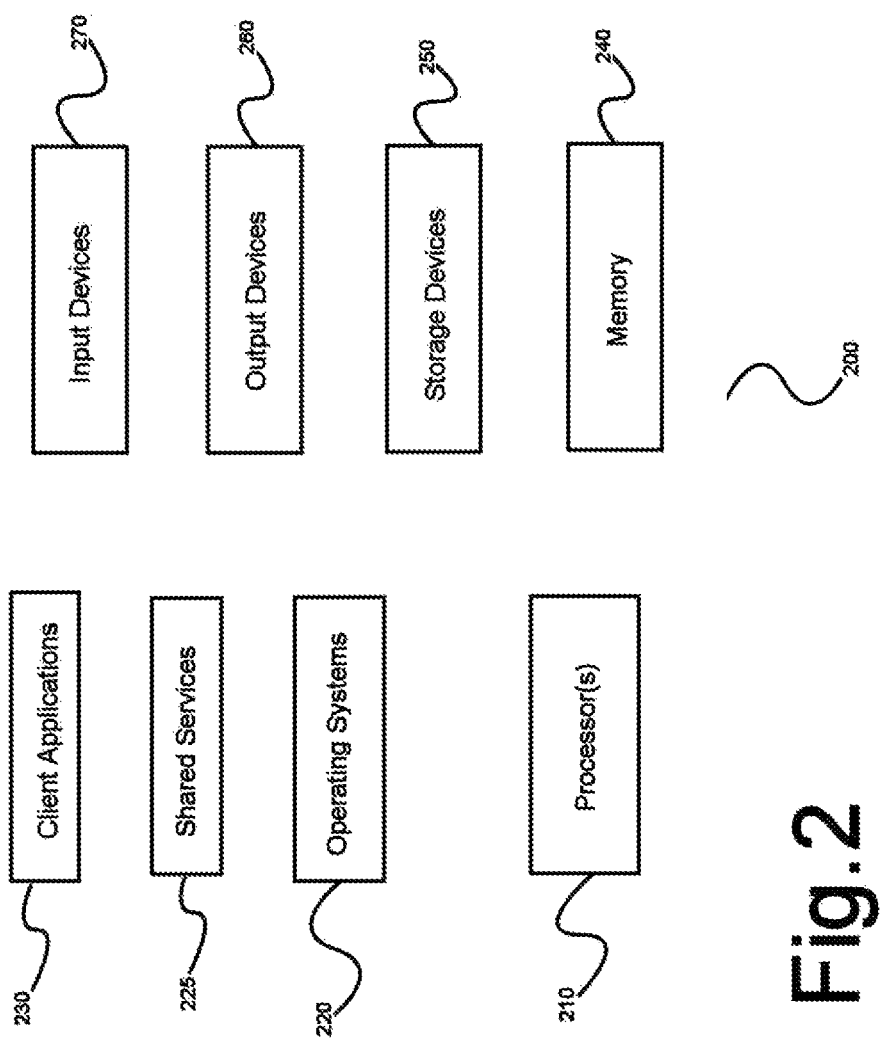
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
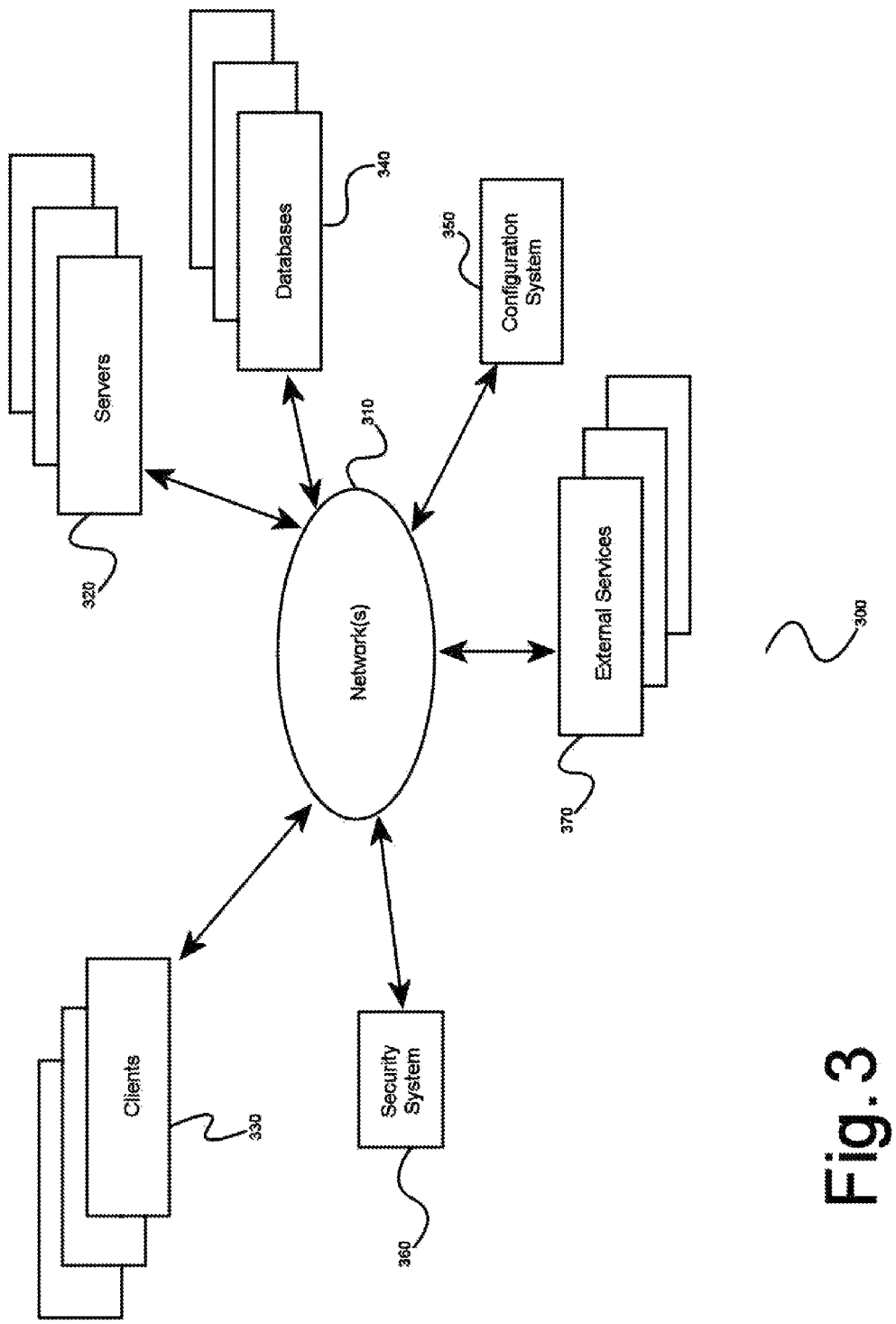
FIG. 3 is a block diagram showing an exemplary architectural arrangement of clients, servers, and external services, according to an embodiment of the invention.
Figure 4:
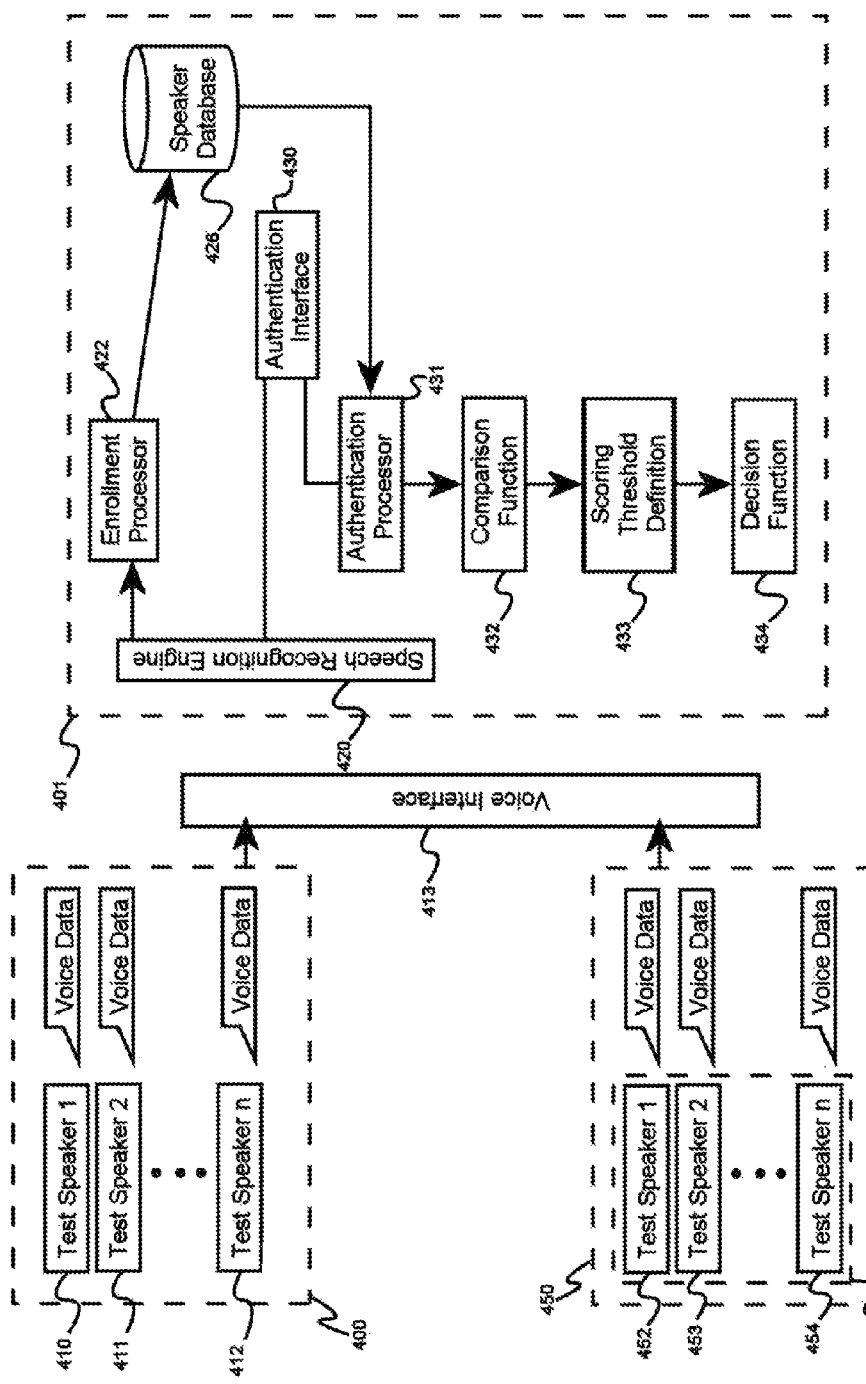
FIG. 4 (PRIOR ART) is block diagram of a typical speaker authentication system according to the art.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop, MapReduce, BigTable, and so forth). In some embodiments variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration 350 system or approach is specifically required by the description of any specific embodiment.

Figure 12:
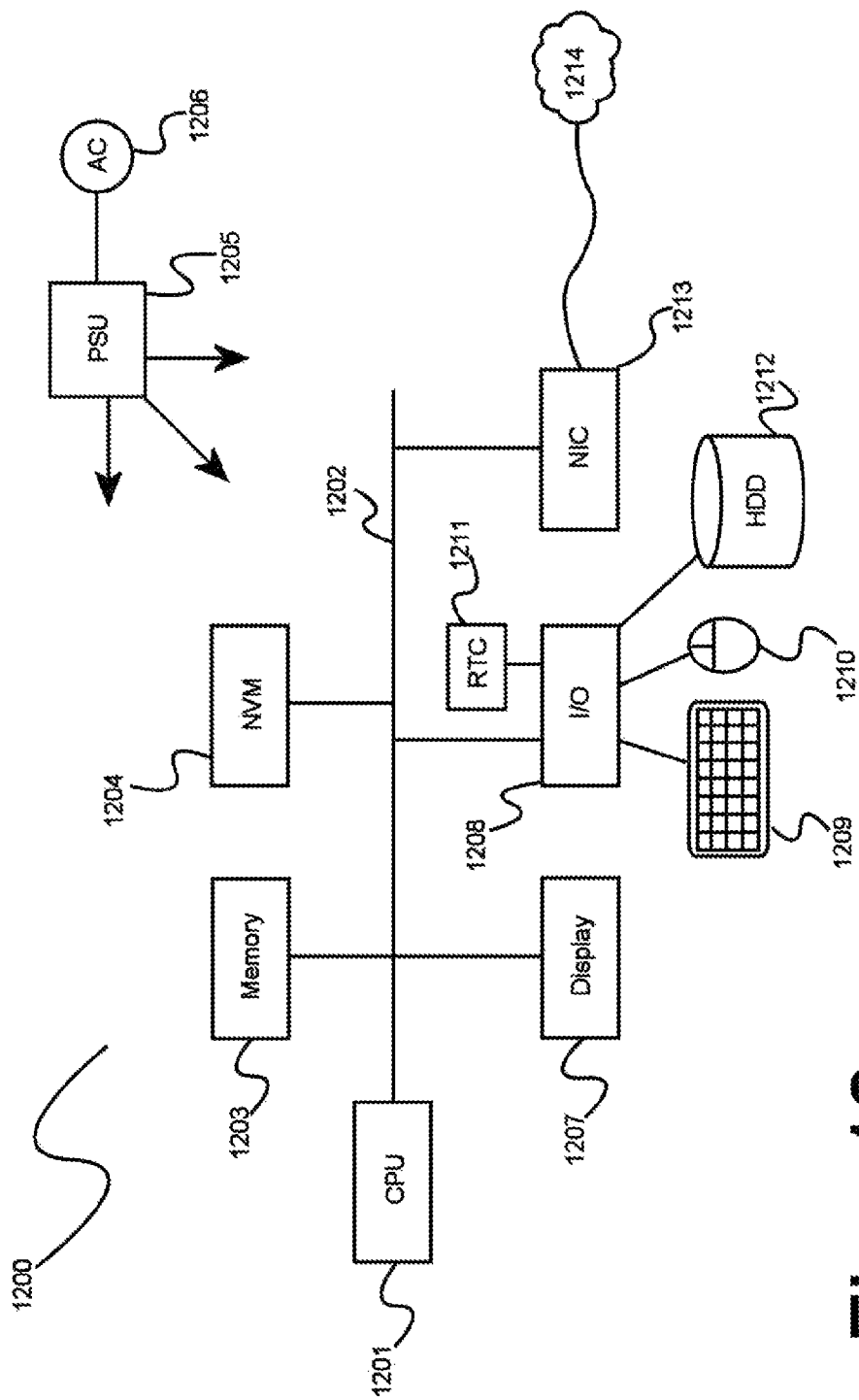
FIG. 12 is another block diagram illustrating an exemplary hardware architecture of a computing device used in various embodiments of the invention.

FIG. 12 shows an exemplary overview of a computer system 1200 as may be used in any of the various locations throughout the system. It is exemplary of any computer that may execute code to process data. Various modifications and changes may be made to computer system 1200 without departing from the broader spirit and scope of the system and method disclosed herein. CPU 1201 is connected to bus 1202, to which bus is also connected memory 1203, non-volatile memory 1204, display 1207, I/O unit 1208, and network interface card (NIC) 1213. I/O unit 1208 may, typically, be connected to keyboard 1209, pointing device 1210, hard disk 1212, and real-time clock 1211. NIC 1213 connects to network 1214, which may be the Internet or a local network, which local network may or may not have connections to the Internet. Also shown as part of system 1200 is power supply unit 1205 connected, in this example, to ac supply 1206. Not shown are batteries that could be present, and many other devices and modifications that are well known but are not applicable to the specific novel functions of the current system and method disclosed herein.

In various embodiments, functionality for implementing systems or methods of the present invention may be distributed among any number of client and/or server components. For example, various software modules may be implemented for performing various functions in connection with the present invention, and such modules can be variously implemented to run on server and/or client components.

Conceptual Architecture

According to a preferred embodiment, a system 500 according to the invention automatically builds a collection of test scripts that are used to test a speaker authentication system 501 using existing voice data from previously enrolled speakers as test data. The invention also comprises techniques for modifying voice data to, for example, mimic degraded voice network conditions, and for using modified data in assembling a plurality of test scripts to enhance testing of speaker authentication system 501.

Figure 5:
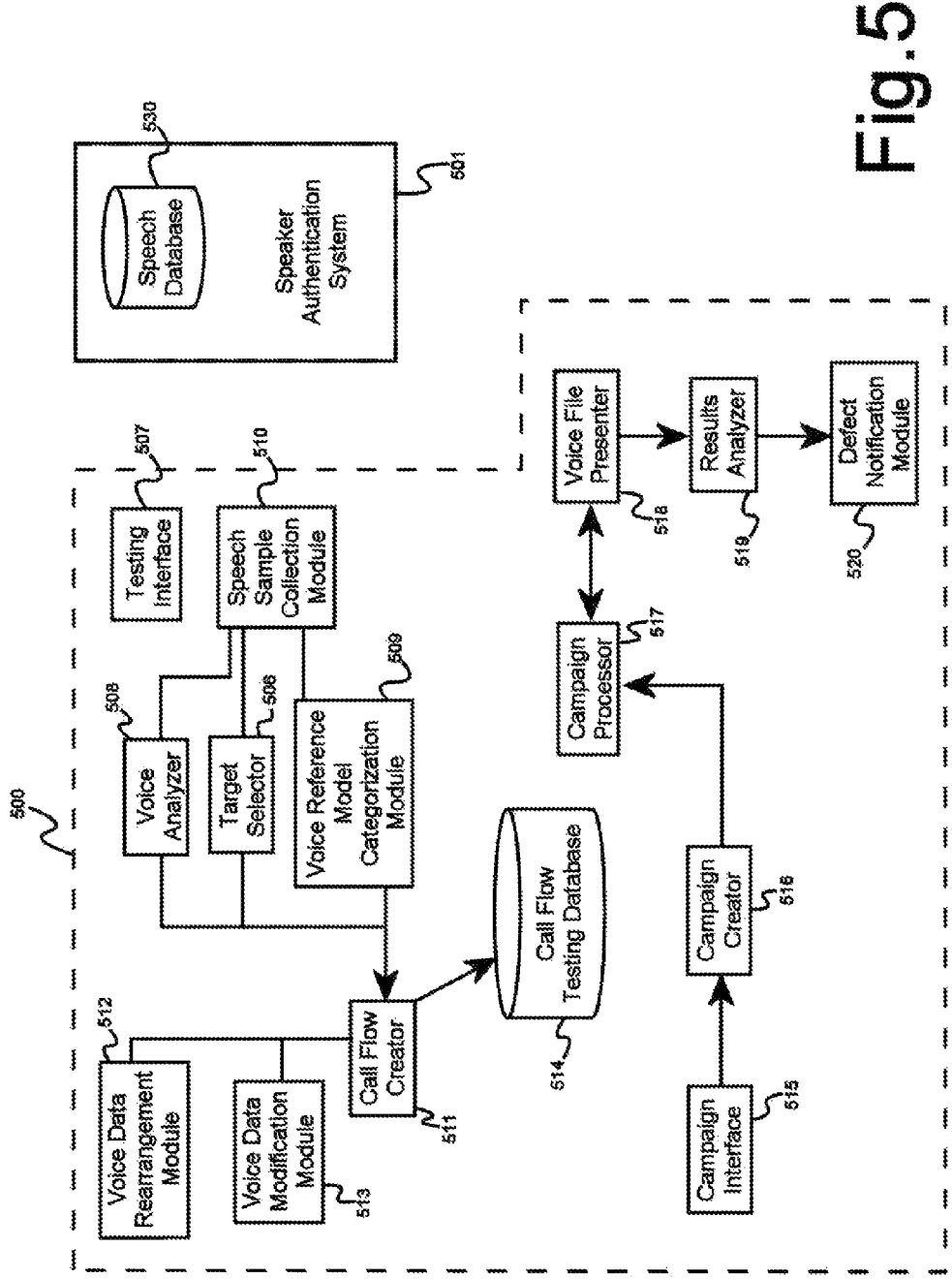
FIG. 5 is a system diagram of a preferred embodiment of the invention.

FIG. 5 provides a high-level diagram of a preferred embodiment of the invention, which will be useful for discussing aspects of the invention and improvements inherent in the invention over systems known in the art. According to the embodiment, speaker authentication test system 500 is used to test speaker authentication system 501. Testing interface 507 is a software module presenting a user interface that may be used to identify a plurality of desired testing scenarios to be used for testing speaker authentication system 501. In a typical embodiment, items to be tested may comprise a list of user accounts of speaker authentication system 501 that represent speakers who have previously enrolled into the system (the "test targets").

Speaker authentication testing system 500 accesses speech database 530 of speaker authentication system 501 of the system to be tested. Speech database collector 510 collects available voice reference models from speech database 530 from a set of previously enrolled speakers. In some cases, a voice reference model that is retrieved from speech database 530 is categorized by voice reference model categorization software module 509, using metadata available from speaker authentication system 501 to identify one or more specific characteristics associated with a specific speaker (for example, gender, age, ethnicity, etc.). Voice reference models of previously enrolled speakers are then analyzed by voice analyzer software module 508 to identify specific components within the voice reference models that may be reused and rearranged to assemble a testing script that may be directed at a test target; for example, in a case where a voice reference model contains an account number, voice data from a voice reference model containing the digits may be broken up into individual components where each component comprises voice data corresponding to a single spoken digit of the account number. Voice data components are then separated and rearranged by voice data rearrangement software module 512 to create a new speech sample for testing. Target selector software module 506 may select a plurality of target users of the speaker authentication system that will be used to test the speaker authentication system. Voice data rearrangement module 512 may rearrange voice components so that a resultant speech data sample will match specific authentication information required to authenticate specific test targets. This may be done multiple times using different voice reference models from speech database 530 to create a set of voice authentication test scripts for a specific test target (herein referred to as "impostor test scripts"). In a preferred embodiment of the invention, some or all of the test scripts may be passed to voice data modification unit 513 for modification, thus creating additional test scripts to mimic one or more types of degraded voice network environments. Voice modification techniques used by voice data modification unit 530 may include, but are not limited to, insertion of ambient noise, insertion of specific characteristics of various voice network types such as voice over IP networks or mobile telephony networks, modification to simulate a specific speaker age, and modification to simulate effects of speaker stress or illness.

When speech database collector 510 collects a test target's actual voice reference models, associated speech data may passed to voice data modification unit 513 and a set of voice test scripts based on the test target's actual voice are created by modifying the speech data to represent a degraded voice network environment (referred to as "legitimate test script"). Voice modification may include, but is not limited to, ambient noise, characteristics of various voice networks such as a voice over IP network, age, and the effects of speaker illness or stress.

Once a set of new testing scripts is created for a test target, a test call flow may be created by call flow creator 511 and stored in call flow testing database 514. This process is repeated for each test target identified in testing interface 507.

In some embodiments of the invention, only voice reference models drawn from the same category as a test target speaker may be created and included in a testing call flow, but this is not always the case. For example, if a test target is identified as a male of age 41, test script creation may use voice reference models of speakers determined to be between the ages of 35 and 55.

Once call flow testing database 514 is populated with a desired number of test call flows, a campaign to test speaker authentication system 501 is created by campaign interface 515. Campaign creator 516 retrieves call flows from call flow testing database 514 and passes the retrieved call flows to campaign processor 517. Campaign processor 517 presents a corresponding voice file using voice file presenter 518 to voice authentication system 501. For each test script that is presented to speaker authentication system 501, a result of whether the system has authenticated the speaker or not is analyzed by results analyzer 519. In the case of a false accept (i.e. system 501 granted access to an impostor test script), speaker authentication system 501 is notified by defect notification process 520 that there is a security problem and that corrective action should be taken. In the case of a false reject (i.e. a genuine speaker was rejected by system 501), speaker authentication system 501 is notified by defect notification process 520 that there is a usability problem (because a legitimate user may be excluded from access to a system protected by speaker authentication system 501) and that corrective action should be taken.

Description of Exemplary Embodiments

Figure 6:
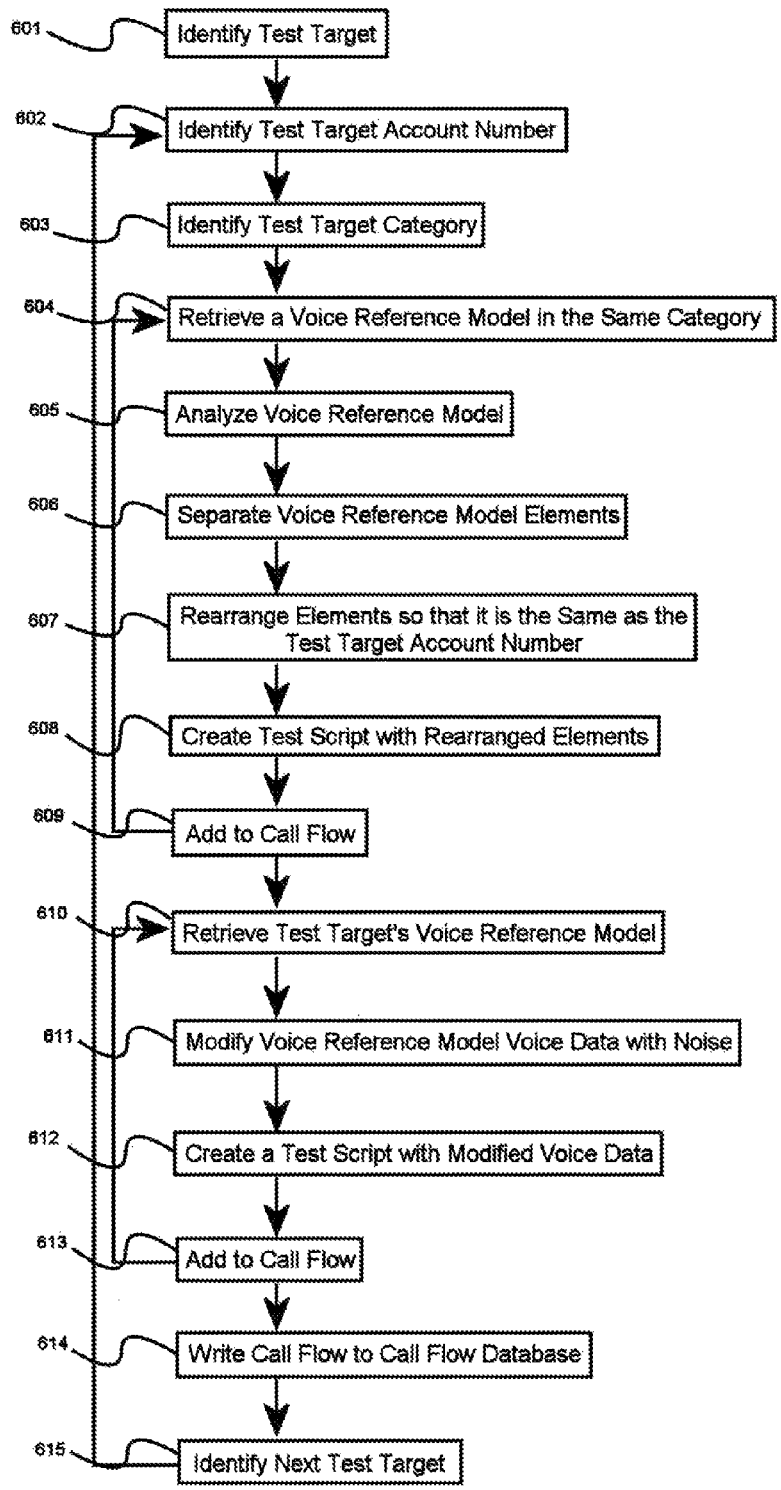
FIG. 6 is a process diagram for setting up an exemplary testing methodology.

FIG. 6 is a process flow diagram of a process for creating test scripts and call flows according to an embodiment of the invention. In a first step 601, a test target is identified. This is generally conducted automatically by polling a speech database 530 of enrolled speakers upon commencement of testing activity, but can also be done using a test setup interface 507 or a combination of both or by some other means. The test target's identification information that would normally be used for speaker verification is identified in step 601. For this example, the identification information is a numeric account number. If the speaker authentication system 501 that is to be tested contains category information for the test target, it is noted. In step 604, speech database 503 is accessed to retrieve voice reference model information for other speakers in the same category. The voice reference model is retrieved and analyzed in step 605 to identify available speech components that could be used for test script creation. In step 606, the voice data components (in this example, digits) are separated into voice data corresponding to individual parts (i.e. corresponding to each digit). The voice data components are then rearranged in step 607 to match the digits of an account number identified in step 601. There would now be a new script created in step 608 of the test target's account number but in another speaker's voice. Furthermore, the other speaker's voice may be similar to the test target in that it may be from a speaker of the same age, gender, or ethnicity from the category identified in step 603 and step 604. The test script is then added to the test call flow in step 609. Additional test scripts are added to the test call flow by repeating steps 604 to 609.

Once a suitable number of test scripts are created and added to the test call flow, the system retrieves that test target's voice reference model from speech database 530 in step 610. In step 611, speaker authentication identification information (in this example, digits representing the account number), is passed to voice data modification unit 513 for sound effect manipulation. The effects that are added to the voice script can be, but are not limited to, changes reflecting a degraded voice network, such as a voice over IP network, changes mimicking speaker of a different age or the effects of speaker stress or illness, and ambient noise added to the voice data. A test script with one or more of the aforementioned effects is created in step 612. In step 613, the test script is added to the test call flow for the test target. Additional test scripts are added to the test call flow by repeating steps 610 to 613.

Once all the test scripts are completed, the test call flow with the test scripts is written to call flow database 514.

For each additional test target, the next target is identified in step 615 and the process begins again at step 602.

Figure 7:
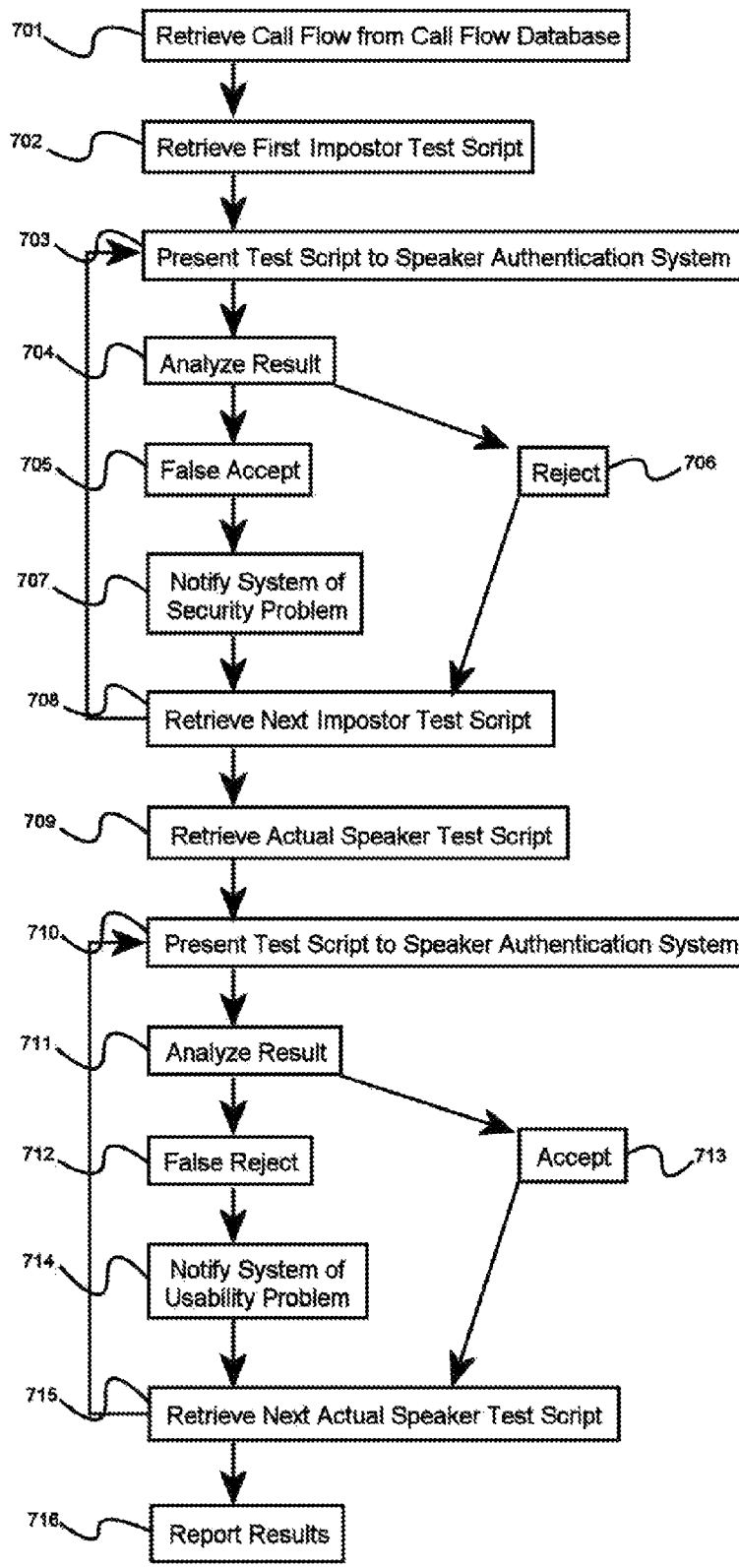
FIG. 7 is a process diagram for executing an exemplary testing methodology.

Referring now to FIG. 7, in step 701, a call flow is retrieved from call flow testing database 514. From the test call flow, the first impostor test script is retrieved in step 702. In step 703 the test script is presented to speaker authentication system 501 that is to be tested. The result of the test will either be that the test script is successfully authenticated as the target test, or that the test script is not authenticated as the test target. Since the test script is an impostor test script, normal system behavior should be to not authenticate the test script in step 706. If that is the case, the system records the result and continues by retrieving the next impostor test script in step 708, otherwise, if speaker authentication system 501 successfully authenticates the test script, it is deemed a false accept 705, the result will be recorded and the speaker authentication system will be notified of the security problem in step 707. Moving onto step 708, the system retrieves the next test script in the call flow and the sequence begins again at step 703.

Referring again to FIG. 7, in step 709, the sequence to test using the speaker's actual voice reference model begins. In step 709, the system retrieves the first legitimate test script. In step 710 the test script is presented to the speaker authentication system 501 that is to be tested. The result of the test will be either that the test script is successfully authenticated as the target test, or that the test script is not authenticated as the test target. In this case, since the test script is using the voice data of the legitimate speaker, the normal system behavior should be to successfully authenticate the speaker in step 713. If so, the system records the result, and continues to retrieve the next script in step 715, otherwise, if the speaker authentication system 501 rejects the test script, it is deemed a false reject 712, the result is recorded, and the speaker authentication system will be notified of the usability problem in step 714. Moving to step 715, the system retrieves the next legitimate test script in the call flow and the sequence begins again at step 710.

Once the call flow is complete, the system reports the recorded results of the testing in step 716.

Referring now to FIG. 8, in a preferred embodiment where speaker authentication system 501 is, for example, configured to authenticate a numeric account number, voice data rearrangement process 512 would use the account numbers contained within the voice reference models of multiple speakers who have previously enrolled into speaker authentication system 501 as test scripts. Furthermore, speaker authentication system 500 will use speaker voice data in the same category as determined by voice reference categorization process 509. The speaker authentication system 500 will then rearrange the voice data obtained from the voice reference models to match the digit sequence of the test target's account number. For example, FIG. 8 illustrates two waveforms. The first waveform 800 represents the digits of a test target's account number, five 801, eight 802, four 803, four 804, and one 805. Waveform 850 represents a suitable audio sample of voice data containing digits of another speaker's account number. This voice data will now be used as elements for creating a script to test the speaker verification of the test target, as determined by the categorization process 509, and an impostor test script. The digits in waveform 850 are the digits of the impostor's account number five 851, two 852, four 853, one 854, and eight 855. In this example, voice data rearrangement process 512 would identify and reorganize the sequence of components 851 to 855 to match the sequence of the test target's account number. In this case, the rearrangement sequence would result in five 851, eight 855, four 853, four 853, and one 854 to match the test target's account number. Speaker authentication testing system 500 now has the first test string for use in testing the test target, whose account number is five, eight, four, four, one. Call flow creator 511 would write the resulting impostor test script to call flow-testing database 514. The entire sequence described here would repeat until enough impostor test scripts are available for thoroughly testing the test target. The sequence would commence again for each test target that is to be tested.

Referring now to FIG. 9, the illustration shows two voice data waveforms. In this example, waveform 900 is a voice data sample from a voice reference model retrieved from speech database 530 from an actual test target in an effort to create legitimate test scripts to test a false reject. Since waveform 900 has little or no noise 901, voice data modification unit 513 modifies waveform 900 by adding ambient noise 951 to waveform 900. The resultant waveform 950 is added to call flow testing database 514 by call flow creator 511 to be used as a legitimate test script to test speaker authentication system 501 during the test execution effort. By providing this functionality within the test setup process, testing can be done in an automated fashion using multiple voice data samples from a given test target. The idea in this example is to test using existing voice data with typical effects, in this example ambient noise, seen on a various communications network in order to test the speaker authentication system 501 more robustly and in an automated fashion. In another exemplary interpretation of FIG. 9, the resultant waveform 950 can correspond to noise that corresponds to the effects of a mobile phone network. In yet another exemplary interpretation of FIG. 9, the resultant waveform 950 can correspond to background noise in, for example, a public location, train station, or retail establishment.

As mentioned above, it is desirable to test the speaker authentication systems 501 to improve speaker authentication accuracy by identifying false accepts and false rejects in a variety of communication network conditions that are typically found in typical communication networks. The following table is an example describing six different testing scenarios when creating testing call flows for call flow testing database 514:

TABLE 1

Example of Test Cycles for Enrollment and Verification.

| Campaign | Speech Dataset | Type | Outcomes |
|---|---|---|---|
| 1 | Clean Sample | Impostor | Identify false accepts |
| 2 | Clean Sample | Legitimate | Identify false rejects |
| 3 | Modified Set 1 (output from voice data modification unit 513) | Impostor | Identify false accepts |
| 4 | Modified Set 1 (output from voice data modification unit 513) | Legitimate | Identify false rejects |
| 5 | Modified Set 2 (output from voice data modification unit 513) | Impostor | Identify false accepts |
| 6 | Modified Set 2 (output from voice data modification unit 513) | Legitimate | Identify false rejects |

The key point of Table 1 is that a typical testing scenario would include one or more speech datasets within the testing call flows in call flow testing database 514 representing a good communication network (that is, clean samples) and other datasets that mimic degraded conditions such as those described with reference to FIG. 9. Other modified datasets could be, but are not limited to, datasets that represent the insertion of specific characteristics of voice network types such as a voice over IP networks and mobile telephony networks, datasets resembling the effects of a speaker's age, and datasets resembling the effects of speaker illness. Each call flow then uses these datasets to test for false accept and false reject conditions, in an automated fashion, to improve the speaker authentication system.

Figure 10:
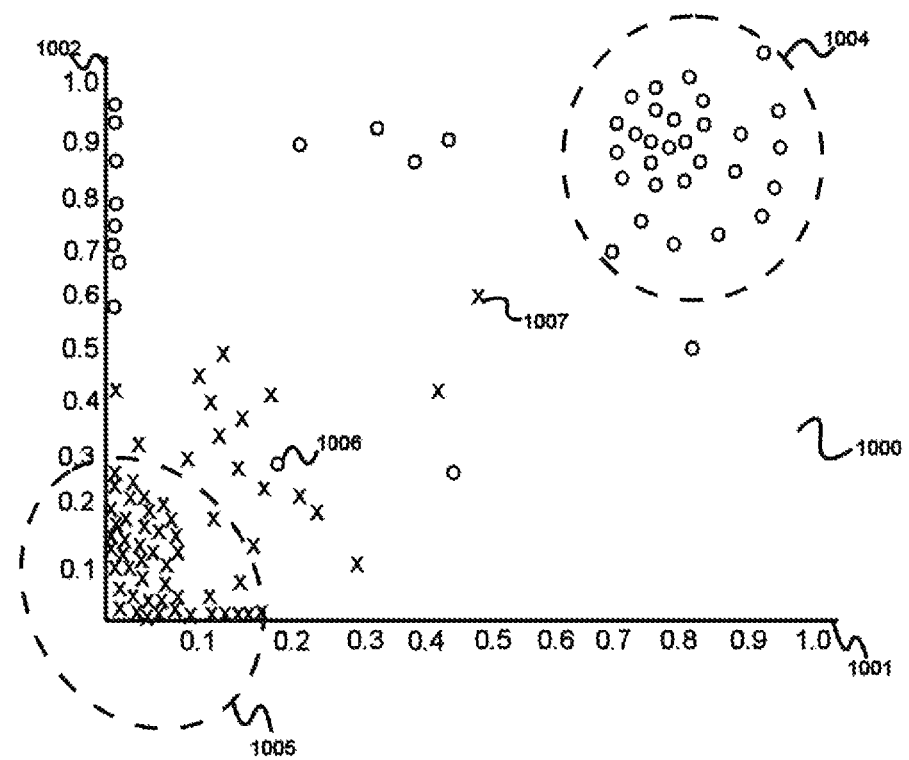
FIG. 10 is an exemplary scatter analysis diagram of a two dimensional authentication decision-making.

Referring now to FIG. 10, scatter diagram 1000 is an exemplary representation of a graph used to score results of testing speaker authentication system 501 based on known legitimate speakers and known impostors using methods described herein. The "o" markers on graph 1000, for example 1006, represent a legitimate speaker for speaker authentication system 501. The "x" markers, for example 1007, represent an impostor speaker for speaker authentication system 501. Horizontal axis 1001 of graph 1000 represents scoring level for the first authentication data element used to authenticate a speaker, for this example, the digits representing the speaker's account number. Vertical axis 1002 represents the scoring level for the second authentication data element used to authenticate the speaker, for this example, the voice data corresponding to the speaker speaking her date of birth. The further along to the right that the "x" marker or the "o" marker falls on horizontal axis 1001, the higher the speaker scored in authenticating her account number. The same applies to vertical axis 1002 for the authentication scoring result for the date of birth authentication data element. When a properly working speaker authentication system 501 is tested by speaker authentication test system 500, legitimate speakers (i.e. the "o" markers) should reside primarily in the upper right hand quadrant of graph 1000, for example 1004. Furthermore, impostors (i.e. the "x" markers) should fall in the lower left quadrant of graph 1000, for example 1005. Scoring results in this manner also indicates areas where speaker authentication system 501 can improve. For example, 1006 is a known legitimate speaker who scored low on both account number and date of birth authentication. This would indicate a potential usability issue. For speaker 1007, the speaker scored high in both account number and date of birth authentication, but is a known impostor. This would indicate a security issue.

Figure 11:
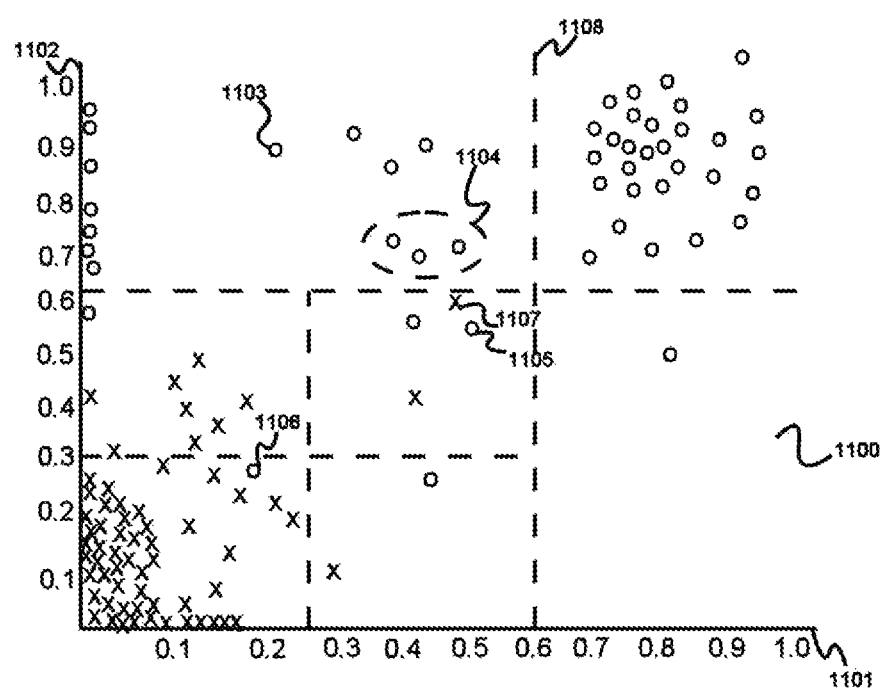
FIG. 11 is an exemplary scatter analysis diagram of a zone-based two dimensional authentication decision-making.

FIG. 11 illustrates a similar scatter diagram 1100 to FIG. 10 that additionally uses a zoned configuration to determine how to manage security and usability issues resulting from accepted and rejected speakers in speaker authentication system 501. As in FIG. 10, the "o" markers on graph 1100, for example 1105, represent a legitimate speaker for speaker authentication system 501. The "x" markers, for example 1107, represent an impostor speaker for speaker authentication system 501. Horizontal axis 1101 of graph 1100 represents the scoring level for the first authentication data element used to authenticate the speaker, for this example, digits representing the speaker's account number. Vertical axis 1102 represents the scoring level for the second authentication data element used to authenticate the speaker, for this example, the voice data corresponding to the speaker speaking her date of birth. The further along to the right that the "x" marker or the "o" marker falls on horizontal axis 1101, the higher the speaker scored in authenticating her account number. The same applies to vertical axis 1102 for the authentication scoring result for the date of birth authentication data element. The zones separated by, for example, line 1108 determine collective actions that can be taken for the markers that reside within the zone based on whether the speaker is an impostor (i.e. an "x" marker) or a legitimate speaker (i.e. an "o" marker). For example, legitimate markers 1104 represent ambiguity on authenticating account number but a pass on the date of birth authentication. This result would be provided to speaker authentication system 501 by defect notification process 520. For marker 1103, the speaker was authenticated on date of birth analysis only. This result would be provided to speaker authentication system 501 by defect notification process 520. For speaker 1106, the legitimate speaker was not authenticated; this signifies a usability issue. This result would be provided to speaker authentication system 501 by defect notification process 520. Speaker 1107 and speaker 1105 are in a zone that implies ambiguity in authentication. This result would be provided to speaker authentication system 501 by defect notification process 520. The speaker authentication system 501, when notified can then take the appropriate corrective action based on the type and severity of the notification.

The skilled person will be aware of a range of possible modifications of the various embodiments described above. Accordingly, the present invention is defined by the claims and their equivalents.

What is claimed is:

1. A method for testing performance of a contact center using virtual agents, the method comprising:
- defining a behavior profile that specifies behavioral response of a virtual non-human agent to a call to the contact center;
- importing actual performance data regarding a human agent from a configuration server in a contact center environment to create the behavior profile;
- logging the virtual non-human agent into a contact center server to respond to calls to the contact center;
- generating, using a call generator, calls to the contact center to simulate actual inquiries to the contact center;
- assigning the virtual non-human agent to respond to the generated calls according to the at least one behavior profile; and
- recording details of calls handled by the virtual non-human agent, wherein the virtual non-human agent simulates the behavior of the human agent and, together with the generated calls, simulates operation of the contact center.

2. A system for testing the performance of a contact center, the system comprising:
- a storage medium for storing a behavior profile specifying a behavioral response of a virtual non-human agent to a call to the contact center and a virtual non-human agent profile that enables the virtual non-human agent to be logged in to the contact center;
- a call generator, using a processor, for generating calls to the contact center; and
- a call meter that records, using a processor, details of the calls handled by the virtual non-human agent,
- wherein the virtual non-human agent simulates the behavior of a human agent and, together with the generated calls, simulates operation of the contact center;
- wherein the behavior profile is created based at least in part on performance data regarding the human agent, the performance data obtained from a configuration server in a contact center environment.

3. The system of claim 2, wherein the at behavior profile includes at least one activity to be performed by the virtual non-human agent.

4. The system of claim 3, wherein the at least one activity includes maximum and minimum durations.

5. The system of claim 2, wherein the call generator schedules calls for a predetermined time, interval and volume.

6. The system of claim 2, wherein the at least one virtual agent handles calls according to a schedule of the at least one behavior profile.

* * * * *